Figure 1:
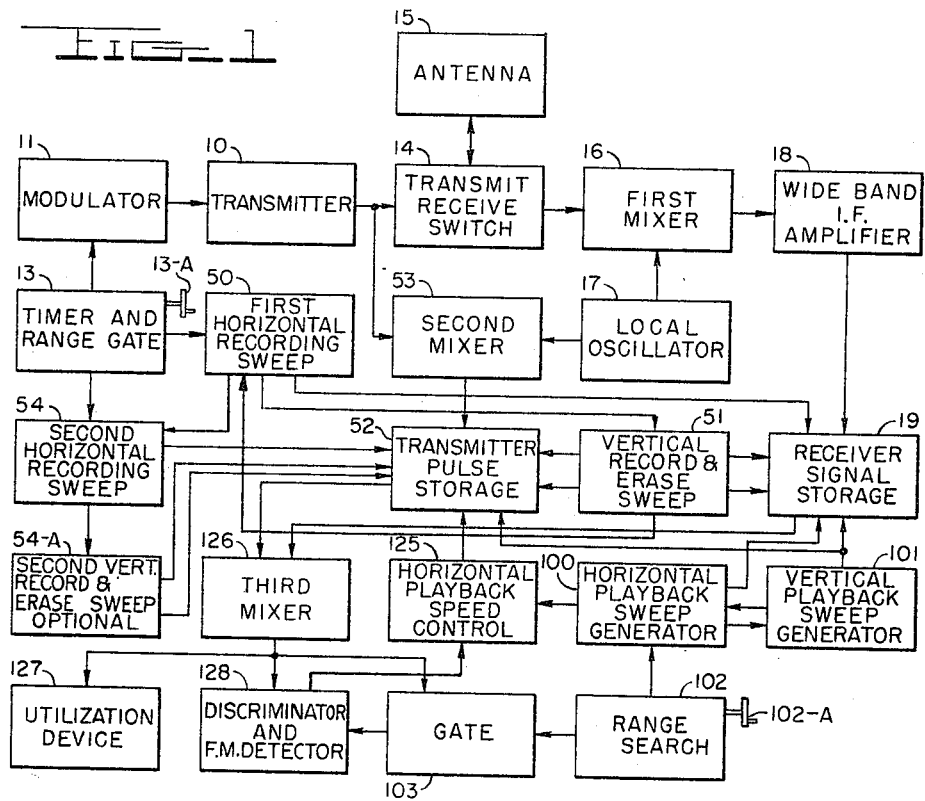

Aug. 9, 1966 R. M. PAGE 3,266,037
SEARCH RADAR SYSTEM
Filed April 13, 1950 6 Sheets-Sheet 1

Inventor
ROBERT M. PAGE

By
ATTORNEYS

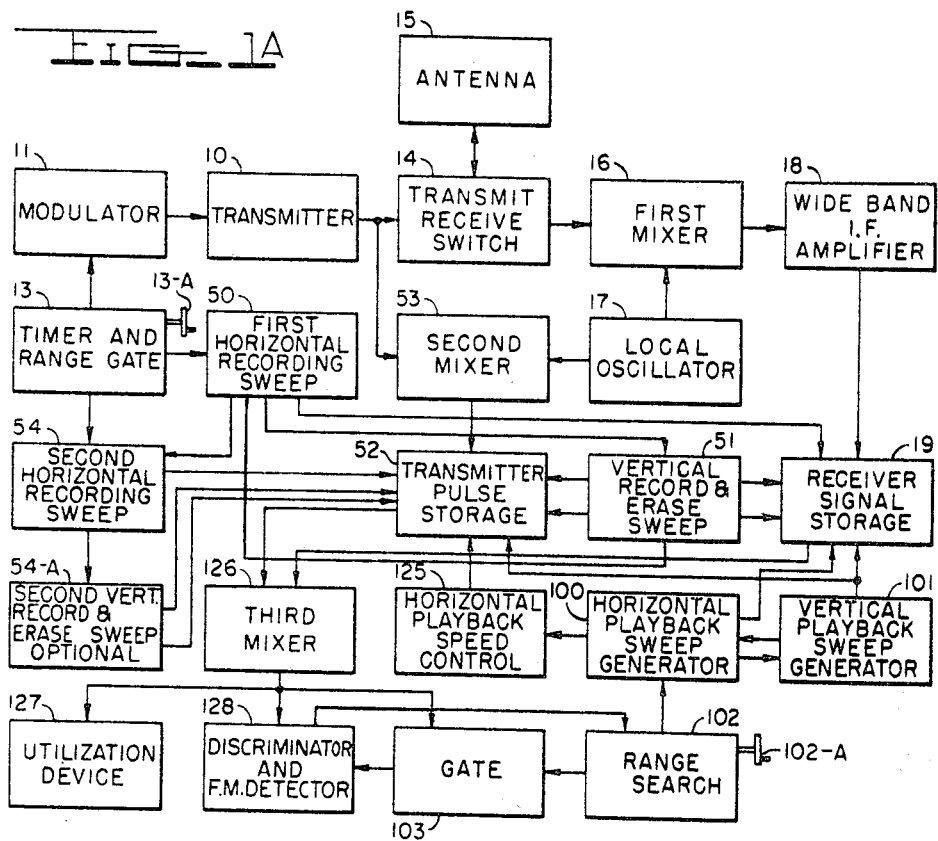

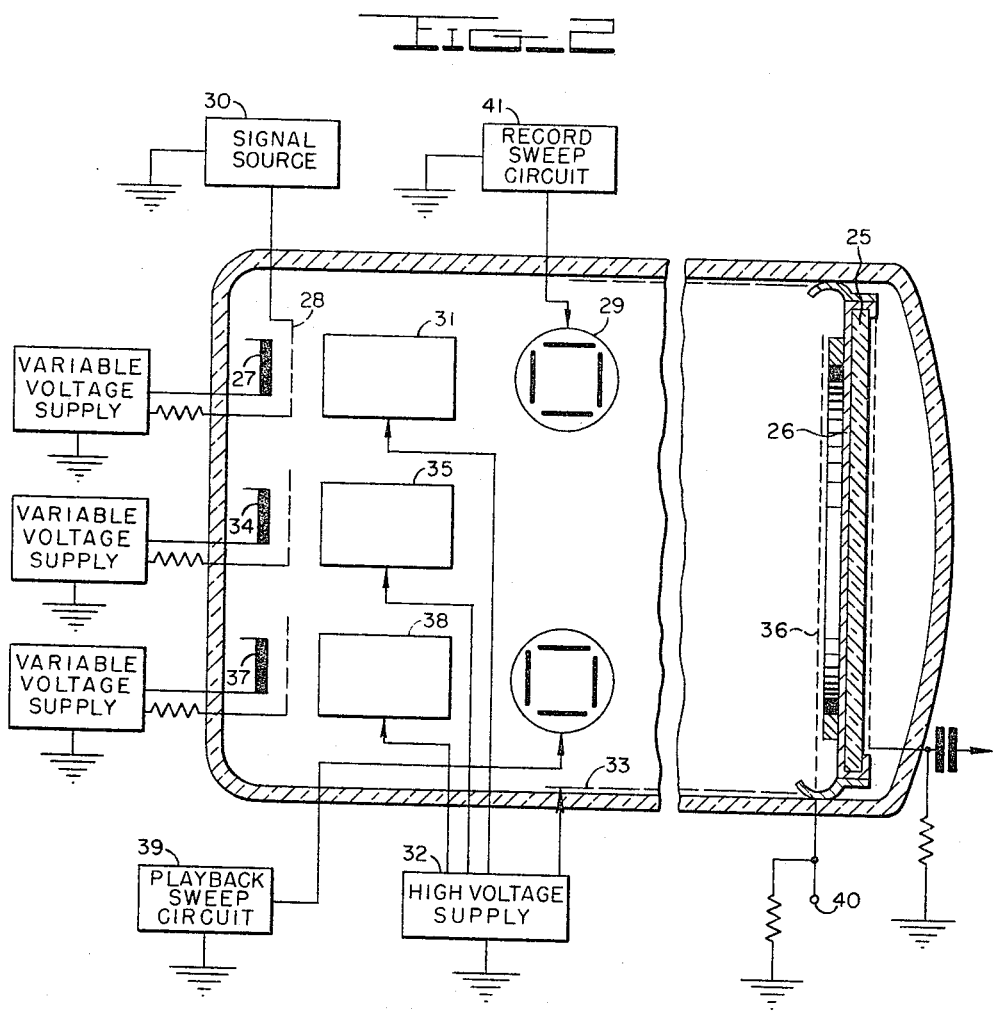

Aug. 9, 1966          R. M. PAGE          3,266,037
                    SEARCH RADAR SYSTEM
Filed April 13, 1950                    6 Sheets-Sheet 4
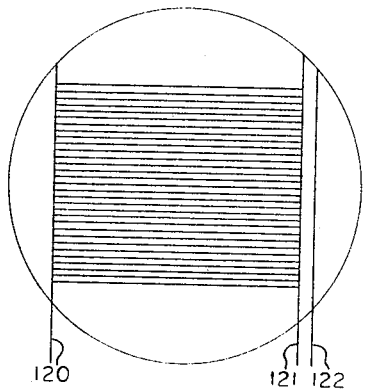
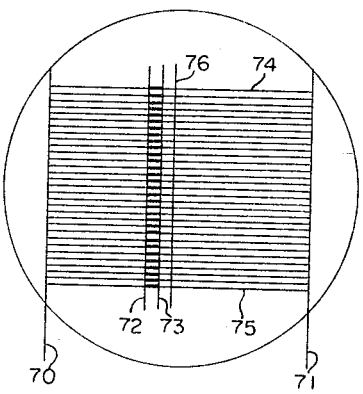
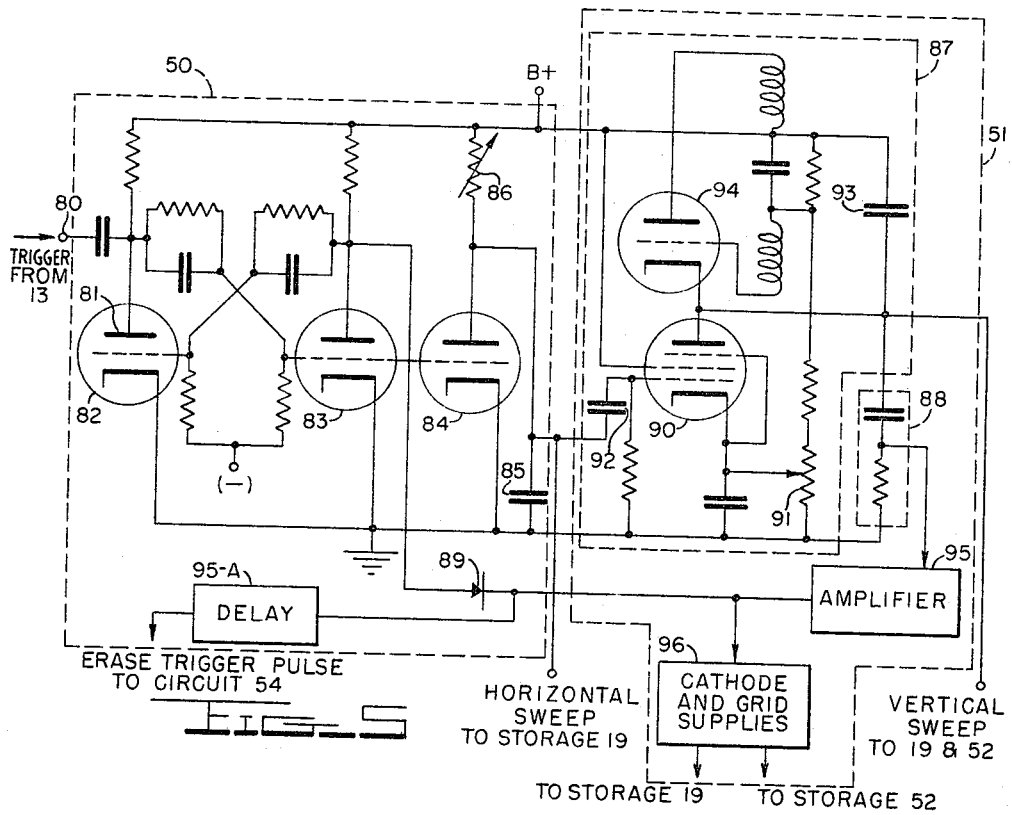
INVENTOR
ROBERT M. PAGE
BY
ATTORNEYS Aug. 9, 1966
R. M. PAGE
3,266,037
SEARCH RADAR SYSTEM
Filed April 13, 1950
6 Sheets-Sheet 5
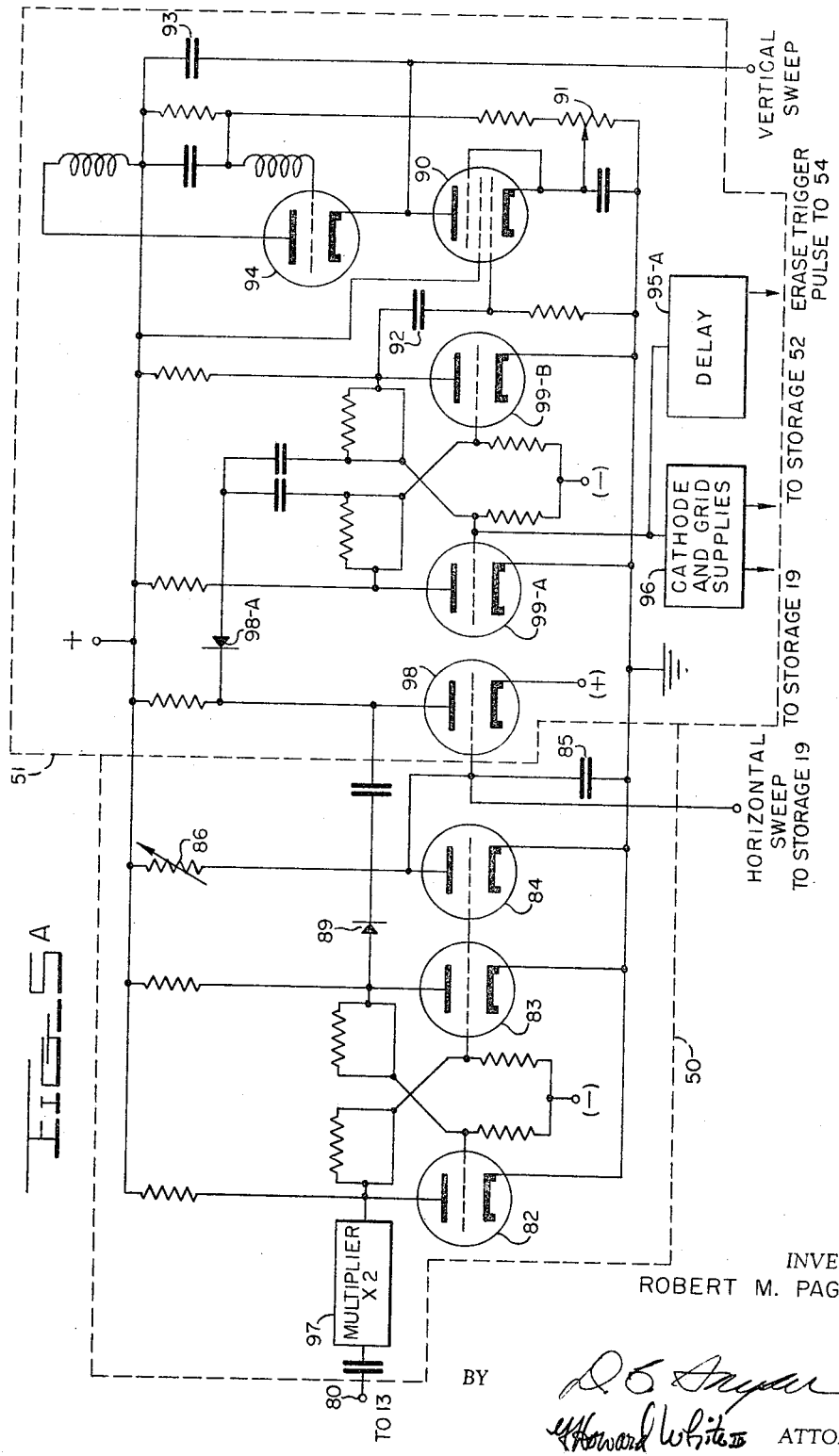
INVENTOR
ROBERT M. PAGE
BY
ATTORNEYS

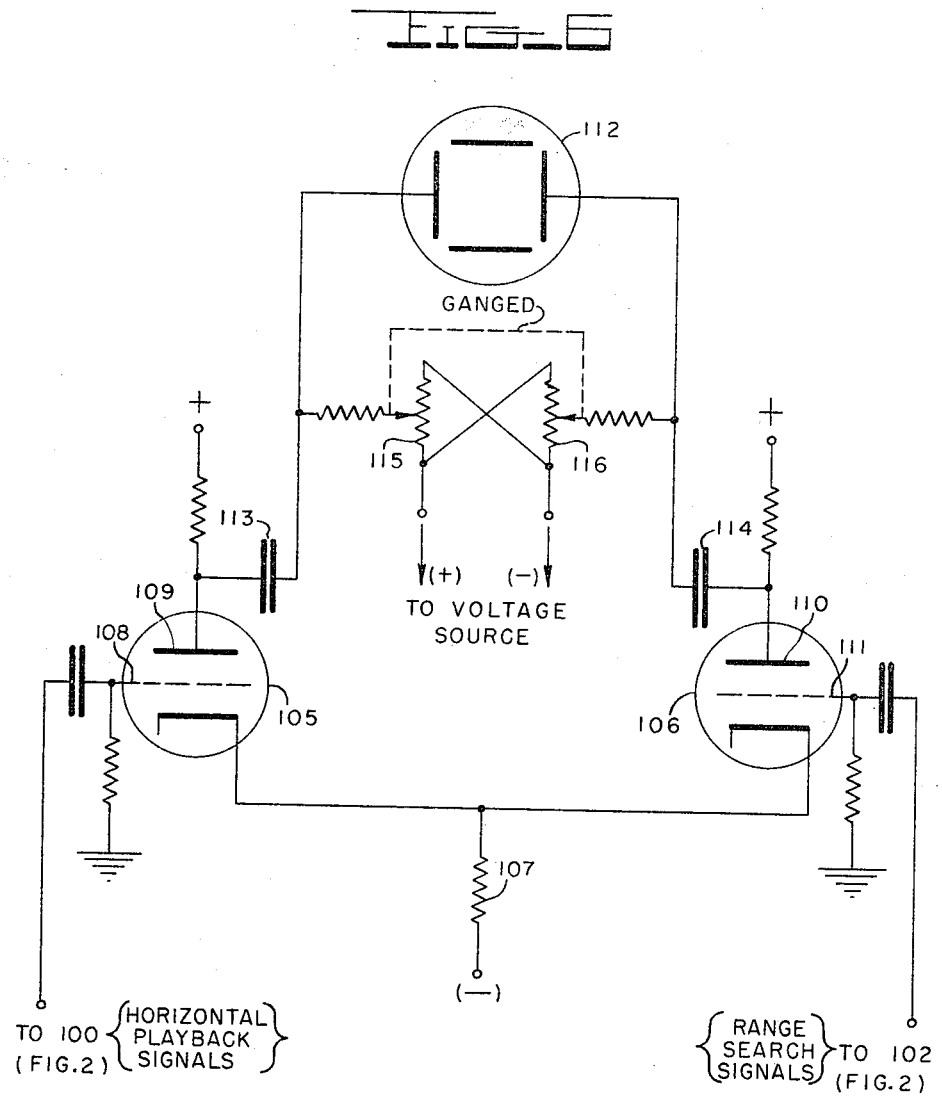

United States Patent Office 3,266,037
Patented August 9, 1966

3,266,037
SEARCH RADAR SYSTEM
Robert M. Page, Camp Springs, Md. (% Naval Research Laboratory, Anacostia Station, Washington 25, D.C.)
Filed Apr. 13, 1950, Ser. No. 155,772
11 Claims. (Cl. 343—13)

The invention described herein may be manufactured and used by or for the Government of the United States of America for governmental purposes without the payment of any royalties thereon or therefor.

This invention relates to radar systems in general and in particular to search receivers employing signal integration techniques for improving the signal to noise ratio.

In conventional radar systems there are in general two avenues of approach when it is desired to increase the operational range. The ever present propagational limitations must always be considered, however within these limitations range may be increased by increasing transmitter power or by improving the signal to noise ratio at the receiver. Increasing transmitter power is not always practical because of the fact that relatively little is gained by any single increase unless the power is at least doubled. It is clear that after transmitter power is doubled several times, even from a modest beginning a large apparatus will result. The signal-to-noise ratio at the receiver has received considerable attention in past efforts, new amplifier tubes and circuits, such as grounded grid amplifiers, coming into use, however again practical limits, for the present at least, are in sight. Thus it remains for completely new approaches to the entire proposition to achieve any sizable improvement.

In my copending application Serial No. 135,215, filed December 27, 1949, entitled "Signal Integrating Radar System" there is described a new radar signal handling technique which offers such an improvement in signal-to-noise ratio at the receiver as to revolutionalize the entire field of pulse echo energy operative locator systems.

Receiver signal-to-noise ratio is dependent upon two energies, signal energy and noise energy. The former depends upon the emitted signal, and has a frequency spectrum bandwidth dependent upon the duration of emitted pulses. The latter energy may be of several forms, atmospheric noise, man made interference or noise generated in the "front end" of the receiver system itself. At any rate this noise energy is generally present in small amounts throughout the entire frequency spectrum. Thus the wider the bandwidth of the receiver circuits employed, the greater will be the quantity of noise energy.

The previously identified application describes a signal handling technique wherein the amplifier bandwidth of a receiver system can be reduced by a large amount with proportional decreases in the quantity of noise energy without decreases in the amount of signal energy. Such action improves the receiver signal to noise ratio tremendously giving a large increase in usable range.

The apparatus of the previous application is ideal for fire control or for search operations at a particular range. It does not offer a continuous range search or a great depth of field near a selected range as is ordinarily required for the "search" type of radar system whose function is primarily to locate generally a distant object but not necessarily provide the pin-point accuracy required of a fire control system.

It is accordingly an object of the present invention to provide a search pulse-echo system employing signal integrating techniques.

Another object of the present invention is to provide a search radar system having extended range capabilities.

Another object of the present invention is to provide a search radar pulse-echo system in which received echo signals occurring over an extended period of time subsequent to each transmitted pulse and consisting of a large group of pulses are stored for subsequent playback of a short portion of the echo signals for each pulse.

Other and further objects and features of the present invention will become apparent upon a careful consideration of the following detailed description when taken in conjunction with the accompanying drawings in which:

FIG. 1 shows in block form a search radar system employing signal integration for improvement of signal-to-noise ratio.

FIG. 1–A shows a variation of FIG. 1.

FIG. 2 shows a typical signal storage tube of a general type suitable for use in the apparatus of the present invention.

Figure 3:
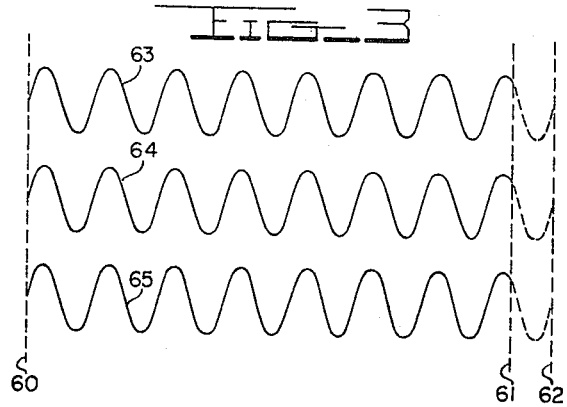

FIGS. 3, 4–A, 4–B show various aspects of signal storage for integration useful in explaining the operation of the apparatus of the present invention.

FIGS. 5 and 5–A show various details of sweep generators employed to control the position of electron beams in storage tube devices.

FIG. 6 shows details of a sweep signal combining and deflection circuit employed in the apparatus of the present invention.

In accordance with the fundamental concepts of the present invention, a pulse-echo locator system is provided in which echoes returned from a band of ranges in response to each transmitter pulse are recorded. The range band so recorded may include the entire operable range of the system or only a portion thereof. The echoes are stored in such a manner that echoes from many transmitter pulses are retained so as to be co-existent. With echoes from a plurality of transmitted pulses thus made co-existent the integration principles of the previously identified application may be applied, playing back a short range section of the stored echo group following each transmitter pulse, the same range for each group, so that echoes returned from the same range for each transmitter pulse will be additive. The duration of the stored portion of each echo group which is scanned to provide output signals is made approximately equal to the transmitted pulse duration so that the entire echo energy as obtained from each pulse may be used. This duration is quite short (164 yards per microsecond of pulse) hence only a small segment of range is covered in each playback sequence. To cover the entire stored range band, successive playbacks of the short duration portions of each echo group are made at differing ranges until all of the range band has been covered.

With particular reference now to FIG. 1, the apparatus shown in block form therein indicates a preferred manner in which the principles of the present invention may be applied. This apparatus is shown and described with particular attention to a radar form of pulse-echo apparatus however the general principles are equally applicable to other forms of apparatus such as a sonar or underwater sound system.

For radar pulse-echo operation, short duration pulses of high frequency electrical energy are generated by the transmitter 10 under duration control of the modulator 11 and repetition frequency control of the timer and range unit 13. Energy thus produced is applied through the transmit-receive switch 14 for radiation by a conventional, dual-purpose, transmitting-receiving antenna 15. Transmitted energy returned by reflection from distant objects is intercepted by the antenna 15 and applied through the transmit-receive switch 14 to the first mixer 16 wherein it is mixed with locally generated signals from local oscillator 17 to provide intermediate frequency signals for a wide band intermediate frequency amplifier 18.

All components thus far mentioned may be conventional radar components operated in a conventional manner at conventional radar frequencies. As is customary practice, the wide band amplifier 18 and all circuits prior thereto must have sufficient bandwidth to pass the frequency spectrum of the transmitter pulses.

Additional components are employed in the apparatus of FIG. 1, which, although they are not customarily associated with radar systems in widespread use at the present, the general principles thereof are described in the previously identified copending application.

Received signals amplified by the intermediate frequency amplifier 18 are stored at a carrier frequency by the receiver signal storage device 19. Storage device 19 may be some form of electron beam device such as a "memory" tube capable of retaining high frequency signal variations for a finite period of time. A typical storage tube is described in a copending application in the name of A. V. Haeff, Serial Number 768,790, filed October 15, 1947, now Patent No. 2,813,998, entitled "Method of Storing, Maintaining and Reproducing Electrical Signals and Means Therefor." It is shown in FIG. 2 and subsequently is described briefly. The carrier frequency stored may be the frequency employed by the amplifier 18 or if a frequency reduced therefrom is desired, frequency changing equipment such as another local oscillator and mixer may be included in the storage device of block 19. Such additional circuitry would normally be unnecessary because the local oscillator 17 would normally be set so that the intermediate frequency signal in amplifier 18 is of a frequency suitable for recording by storage device 19. Carrier wave signals resultant to each successive transmitter signal are stored as by electron concentration variations along a plurality of spaced lines, one above the other, such as on the familiar television rectangular raster. As stored each is intensity modulated in correspondence with the echo signals from the selected range band responsive to a particular transmitter pulse. Thus if the storage device is capable of resolving a typical 1000 lines, the echo signals from a thousand transmitter pulses may be stored and thus made co-existent.

To explain signal storage and reproduction more adequately to facilitate further discussion, reference is now made to FIG. 2 which shows generally, features of the signal storage tube of A. V. Haeff previously referred to.

This storage tube has an insulator plate 25 with an active surface 26 placed thereon. Typically the plate 25 may be of glass and the active surface distributed willomite particles.

An initial charge distribution pattern representative of the signal to be stored may be placed on the active surface 26 by an electron gun including cathode 27. The beam energy of this gun may be controlled by grid 28 and deflection means 29 under control of signals to be stored as supplied from signal source 30. Source 30, in the case of receiver signal storage device 19 of FIG. 1 may correspond to the wide bandwidth intermediate frequency amplifier 18. The electron beam is focused by a conventional lens electrode system shown diagrammatically at 31 for which is provided a high voltage supply 32. The main tube anode 33 coated on the interior of the envelope, is also energized by supply 32.

Signals placed on the active surface 26 are maintained thereon by delivering low velocity electrons thereto from an electron gun including the cathode 34 and focusing lens system 35.

Screen possessing close spacing such as 200 mesh per inch collects secondary electrons emitted from the surface 26 upon bombardment by playback scanning electrons from a playback electron gun including cathode 37 and focusing lens system 38. This playback scan is controlled by the playback sweep circuit 39. Output signals produced from the secondary emission current to screen 36 are obtained at terminal 40 and represent the output signals from the receiver signal storage device 19. Record sweep circuit 41 controls the deflection of the record beam from cathode 27.

Signals stored as concentration variations of electrons on the surface 26 may be altered at will (or erased) by adjusting the balance between primary electrons reaching the surface 26 from cathode 27 and secondary electrons leaving it. Thus by proper alteration of the voltages existing on the tube, stored signals may be "erased". In actual operation of the tube there is a critical voltage condition (between the cathode and screen) for optimum recording (storage), as well as another critical voltage between cathode and screen for optimum erasing. In the erasing operation, the effectiveness or rapidity with which complete erasing may be accomplished depends upon the beam current hence a higher beam current will in general provide more effective erasure.

With the particular tube structure shown it is possible to achieve line by line erasure with the electron beam from either cathode 27 or 37 however in the particular application with the apparatus of the present invention it is generally preferable to employ the beam from cathode 27, normally considered the record beam, for erasure also.

For erasure the screen potential is ordinarily held constant while the cathode 27 potential is shifted in any suitable manner to provide the critical erasing voltage between cathode and screen. Simultaneously the grid bias is reduced to increase the beam current for greater erasing effectiveness. As a general proposition the potential difference between cathode and screen is less for erasure than for writing.

Details of a typical storage device 19 for received signals to illustrate the operations of the overall circuit having thus been described in FIG. 2, attention is again directed to the overall circuit of FIG. 1. Horizontal and vertical recording sweep signals are required to control the placement of the echo signals in the receiver storage device 19 and are provided by the first horizontal recording sweep circuit 50 and the vertical recording and erasing sweep circuit 51. The first horizontal recording sweep circuit 50 may be any suitable sawtooth signal generator and is synchronized by a range gating signal from the timer and range unit 13 to start each horizontal storage sweep signal in coincidence with the receipt of echo or return energy from a selected range to last for a selected time interval. Actually the horizontal recording sweep duration may ordinarily be of any period between that corresponding to the duration of the entire range sweep of the radar system and that corresponding to the transmitter pulse duration. The starting time as later described will also be variable throughout the entire range of operation of the radar set. The system is thus capable of operation within wide range limits, however for search operation it is normally the practice to employ storage of signals from all or nearly all of the range interval between successive transmitted pulses. Vertical recording sweep circuit 51 operates to vertically displace the horizontal recording sweep so that the signals from successive transmitter signals will not overlap. Circuit 51 hence will ordinarily operate at some sub-harmonic frequency of the transmitter pulse recurrence frequency as synchronized by a connection thereof to the first horizontal recording sweep circuit 50.

For reference purpose which will be explained later each transmitter pulse signal is also recorded as a carrier wave by a second storage apparatus, the transmitter pulse storage device 52. As with storage of received signals, transmitter signals are stored as carrier waves and by virtue of the operation of second mixer 53 which also receives the signals from local oscillator 17, this carrier wave is of approximately the same frequency as the received signals delivered to receiver signal storage device 19 from amplifier 18. As with the receiver signals, the transmitter signal carrier waves are stored as electron concentration variations along spaced horizontal lines on the face of a storage tube, the lines being located one above the other again providing a rectangular raster. Since the duration of the transmitter signals is generally very short compared to the duration of the range interval being recorded by device 19 and occurs at a different time it is preferable to employ a second horizontal recording sweep generator 54 for the transmitter pulse storage device 52 however the same vertical recording sweep signal for storage device 19 as obtained from vertical recording sweep generator 51 at a sub-harmonic of the transmitter pulse repetition rate may be used in some instances for transmitter pulse storage device 52. Such use effectively maintains the identity between recorded received signals and recorded transmitter signals. Alternately it may be desirable to employ a separate vertical storage and erase sweep generator 54-A which can be identical to sweep generator 51 operative by pulses from horizontal sweep 54 instead of sweep 50. For simplicity only one vertical storage sweep generator 51 will be described.

With transmitted and received signals thus stored and made co-existent for a plurality of transmitted pulses, the stored signals, both transmitted and received are played back coincidentally with each transmitted signal being played back in time coincidence with playback received signals obtained responsive thereto during a period of time equal to the duration of the transmitted signal and obtained from a selected range. This playback occurs in a sequential manner, that is the transmitter pulses are played back in the order in which they occurred with a minimum time lapse between successive playbacks. Each time a transmitter pulse is played back, the received signals responsive thereto as received over a period of time substantially equal to the transmitter pulse duration and obtained from substantially the same range are also played back.

When all received signals at a selected range have been played back, the playback sequence is started again playing back the received signals for another selected range co-incidentally with a repeat playback of the transmitter signals.

The playback scanning sequence may be more fully explained with the aid of FIG. 3 which shows several successive stored received signals. FIG. 3 shows the storage patterns as sinusoidal positional varying horizontal lines of uniform density.

The signal integration principles employed in this invention require that received echo signals returned from a given range in response to successive transmitted pulses be played back in such a manner that the time separations between the playback signals are made almost non-existent and the signals practically continuous. Thus the short duration signals originally employed requiring wide bandwith circuits for faithful reproduction are no longer existent, being replaced by longer signals which can be reproduced by narrower bandwith circuits which inherently are less receptive to noise than wide bandwidth circuits.

Signals employed in pulse-echo locator apparatus are generally short duration pulses of radio frequency energy having a selected radio carrier frequency existing as sinusoidal oscillations. As stored, these oscillations are retained, however their frequency may be reduced from the original carrier frequency to permit easier handling by the storage equipment. For successive signals of this character to be reproduced in such a manner that successive signals are additive to secure the bandwidth reduction desired, particular attention must be given to phase correspondence between successive signals. It is necessary that each successive playback signal occur in phase with the oscillations persisting in a narrow bandwidth "integrating" amplifier resultant to a preceeding signal.

As a general rule, transmitter pulses reflected from constant range (zero range rate) targets will all start with the same phasing but there is ordinarily nothing to control the phase angle at the termination of each pulse and the time lapse at the end of the playback of each recorded pulse so that the phase angle of the carrier waves of the integrated signal remaining in a narrow bandwidth intermediate frequency amplifier from one signal will be in exact correspondence with carrier waves in a succeedent signal when playback of the succeedent signal is started.

Phase coherence between recorded signals on playback can be brought about by close control of the playback of the stored signals. This control involves the adjustment of the playback sweep length or duration so that it occupies a length on the face of the storage tube exactly equal to a multiple of the distance occupied by one cycle of the carrier wave of the stored signal and equal to a period of time differing from the duration of the stored received signal by a small amount.

To illustrate this point, FIG. 3 shows three stored signals. It should be understood that FIG. 3 is a fictitious figure having no direct counterpart in the apparatus, it being included for explanation of signal playback only. In FIG. 3 three stored signals are shown one above the other. These signals are represented as amplitude or position variations for convenience whereas the actual signals stored in the apparatus generally are stored as intensity or electron concentration variations.

For simplicity the signals have been shown in FIG. 3 as existing for practically the entire storage period for received echoes from each of three transmitter pulses. The dotted vertical line 60 represents the starting point for all storage and playback sweeps. The vertical line 61 represents the end of stored pulse signals while the vertical line 62 indicates the end of playback sweeps.

In storage the first signal 63 represents a received signal returned by a distant object responsive to a first transmitter pulse, the signal 64 represents a received signal returned by the same distant object responsive to a second transmitter pulse and the signal 65 represents a received signal returned by the same distant object responsive to a third transmitter pulse. All signals are shown identical which would ordinarily be the case for a constant object range. The signals start at the same phase (which may or may not be zero degrees as shown) and end at some random phase shown as 135°.

In playback the first stored signal 63 is scanned to deliver an output signal in the interval of time the playback beam requires to travel from line 60 to line 61. When the playback beam reaches line 61 it does not flyback immediately but continues to travel from line 61 to line 62 and then returns to line 60 or experiences "flyback." In the time interval represented by the time required for the beam to move from line 61 to line 62 the absence of a recorded signal between lines 61 and 62 prevents delivery of an output signal. When the beam returns to line 60 it then drops down to scan the signal 64.

Received signals actually retained by the storage device 19 will generally be quite different from those represented in FIG. 3. Rather they ordinarily will be retained as in FIG. 4–B which shows a plurality of horizontal lines placed one below the other very much as in a conventional television raster. Each horizontal line in FIG. 4–B represents stored signals originally received over an extended range interval responsive to a single transmitter pulse. All signal storage intervals start at the line 70 and end at the line 71. At one point between these lines each stored signal interval contains an echo signal (between lines 72 and 73) representative of pulse energy reflected from a distant object located in the selected range interval.

The actual spacing between the lines 72 and 73 corresponds approximately to the pulse duration and finds its exact counterpart in the spacing between lines 60 and 62 of the illustrative FIG. 3. This spacing is selected to be slightly longer than the pulse duration and contains an integral number of cycles of the stored carrier wave. Thus the stored received signals only between lines 72 and 73 may be played back for integration purposes as with the signals of FIG. 3. The portion between lines 72 and 73 of a first received signal interval, typically the top horizontal line 74, is played back first, then immediately following, the portion of the second signal immediately below between the same lines 72 and 73. Thus in playback, the portion of all received signals between the lines 72 and 73 will be made additive.

The effect this has upon output pulse length depends upon the linear scanning speed in playback with respect to the original scanning speed during recording. For certain applications it may be desirable to employ a playback scanning speed which is different from the recording scanning speed but it can be seen that in the condition where record and playback both occur at the same speed, the duration of output pulses from the storage device 19 will be greater than the duration of input pulses by a factor equal to the number of signals integrated. In the case of FIG. 4–B this factor is 31 (thirty-one). Since amplifier bandwidth required for pulse reproduction is inversely proportional to pulse duration, the bandwidth of required output amplifier circuits where 31 signals are integrated need be only 1/31 of that of the input amplifier circuits. Since the quantity of random noise energy picked up by an amplifier is proportional to amplifier bandwidth, it is apparent that a direct improvement in signal-to-noise ratio by a factor of 31 ensues.

Following the complete playback of the portion of all stored received signals between the lines 72 and 73, the scanning space is shifted typically to the right in FIG. 4–B to sequentially scan the portion of the received signals from line 73 to another line (76) spaced therefrom by an amount equal to the spacing between lines 72 and 73. In this manner the entire range interval may be searched in a repetitive fashion, it being understood that the portion of the range interval between lines 70 and 72 is normally scanned in portions just prior to the scan of the portion between lines 72 and 73.

It should be understood that the selection of 31 successive received signal intervals in FIG. 4–B is purely arbitrary for illustrative purposes only and not to be interpreted as limiting in any degree. As many as 1000 received signals may be stored, for example, provided the resolving power of the storage medium is adequate to resolve such a number. As a further example of the almost limitless variations possible with this system a condition may be considered where there are 1000 successive received signal intervals stored. Broadly considered, such will give a bandwidth reduction of the order of 1000 to 1 with a corresponding improvement in signal-to-noise ratio.

As a practical matter there is no appreciable pause after the signal portions between lines 72 and 73 are scanned until scan of the portions between lines 73 and 76 is started, rapid flyback to the top line 74 taking place immediately after the scan of the portion between lines 72 and 73 of line 75.

For further practical considerations in sweep generation the vertical scan of the received signals (lines 74–75) takes place at a much slower rate than flyback from bottom to top. Hence it is apparent that the playback scanning limiting lines 72 and 73 will not normally be substantially parallel to the starting line 70 but will be inclined being further therefrom at the bottom (line 75) than at the top (line 74). Thus the portion of line 74 scanned between lines 73 and 76 will be almost directly above (vertically) the portion of line 75 scanned between lines 72 and 73. Such action introduces certain difficulties which are more or less minor and which will be compensated for in the equipment to be described later. Principal among these difficulties is the introduction of a false Doppler frequency (indicating relative motion between the radar system and reflective objects).

The whole proposition of signal integration for usable playback is further complicated by the necessity for removing old stored information (from old pulses) and replacing it with new information obtained at the regular pulse repetition frequency of the radar transmitter. The incorporation of a separate record beam and a separate playback beam in the storage tube of FIG. 2 eliminates many problems of time sharing between recording and playback, permitting substantially continuous playback but the line by line erasure of old information to make way for new information must be performed by the record beam prior to reception of new information. Thus time sharing is required for the record beam so that it may also erase.

Erasure of signals obtained during the oldest storage interval may be accomplished in several ways some of which will be indicated generally here. One way involves altering the gun potentials of the record beam from the record critical voltages to the erase critical voltages during the flyback of the record beam. For erasure thus carried out it is necessary that the flyback beam cover the same portion of the tube as the immediately succeeding forward or record trace. Such is a peculiar requirement which is not met by conventional sweep generators.

Step by step vertical recording and erasing sweep signals for the storage device 19 are provided by the equipment of FIG. 5 which shows certain details of parts of some of the blocks of FIG. 1.

In FIG. 5 "sweep start" signals at terminal 80 are obtained from the timer and range unit 13 of FIG. 1 and may be typically short duration negative pulses produced with an adjustable delay after each transmitter pulse. This delay selects the start of the range interval which will be searched. The delay between each "sweep start" signal and the transmitter pulse producing it is adjustable permitting concentration at any point in the range. The adjustment may be made manually by the handwheel 13–A which controls a conventional form of delay pulse generator such as a one-shot trigger circuit or a tapped delay line.

The negative "sweep start" signals are supplied to the anode 81 of tube 82 which together with tube 83 forms a trigger circuit of the familiar Eccles-Jordan type in which either tube 82 or 83 is conductive. Just prior to the occurrence of the "sweep start" signal the trigger circuit must be considered to be in the condition wherein tube 83 is conductive. The "sweep start" signal reverses this condition, cutting tube 83 off and bringing tube 82 into conduction.

Connected to the grid of tube 83 is the grid of a discharge tube 84 which follows the conductive variations in tube 83. Thus when tube 83 is cut-off, tube 84 is similarly cut-off. At the instant in time when tube 84 is cut-off, the anode potential does not rise abruptly but rises exponentially as capacitance 85 charges through resistance 86, providing a voltage signal rising with time which would be satisfactory for the forward or "record" sweep. The return of the sweep signal to its starting point is effected upon resumption of conduction by tube 84 which by virtue of the low anode resistance thereof when conductive, rapidly discharges capacitance 85.

Tube 83 (as well as tube 84) is brought to conduction by a signal path through a step-by-step voltage generator 87, differentiator 88, amplifier 95, and unilateral impedance element 89 which provides a negative pulse signal for application to the anode of tube 83 when a selected sweep amplitude is reached. The time required for this selected sweep amplitude to be realized may be adjusted at will by adjustment of the resistance 86 through which the charging current for capacitance 85 must flow.

The step-by-step voltage generator 87 is described in detail in my U.S. Patent No. 2,275,460 which for convenience is reproduced in a simple version in FIG. 5. Briefly described it comprises a biased pentode tube 90 which may be considered normally cut-off by virtue of a high positive potential maintained at its cathode from the potentiometer 91. At the start of operations capacitance 93 may be considered as being discharged so that the cathode and anode of tube 94 are at approximately the same potential. The grid of tube 94 is much lower so that tube 94 is effectively cut-off. When the potential across capacitance 85 reaches a selected value, the grid of tube 90 coupled thereto through capacitance 92 rises to a potential sufficient to bring tube 90 to conduction. Anode current for tube 90 is supplied through capacitance 93 consequently as capacitance 93 supplies current for tube 90, the voltage thereacross increases providing a potential drop at the anode of tube 90. This voltage drop is supplied through the differentiator circuit 88 and amplifier 95 to cut-off the currrent flow in tube 82 thereby returning tube 83 to its original conductive condition and with it, tube 84, to discharge the capacitance 85 and stop conduction in tube 90.

This action continues repeatedly responsive to each negative input pulse at terminal 80 until capacitance 93 charges to such a potential as to lower the cathode of the tube 94 to where that tube can be brought to conduction. Tube 94 is placed in somewhat of an oscillatory circuit, operative at a high frequency with heavy current flow to rapidly discharge capacitance 93. As capacitance 93 discharges a potential thereacross is eventually reached wherein tube 94 ceases conduction entirely. Thus the circuit is returned to the original condition.

The resulting potential at the anode of tube 90 is seen to fall in steps, until a limiting potential is reached at which time the potential returns to the original or starting point. Between individual steps the potential remains substantially constant. This potential may be employed for the vertical sweep, each small step at the anode of tube 90 occurring just prior to the start of each horizontal flyback.

To facilitate triggering of the circuit of tubes 82 and 83 by the necessarily small voltage steps at the anode of tube 90, the amplifier 95 may be inserted in the reset path to the anode of tube 83. It should be understood that such a single stage divider is not normally sufficiently stable for frequency division as high as 1000 to 1, however it could provide a 31 to 1 division quite easily.

Additionally this signal is supplied to the cathode and grid power supplies 96 for the storage devices 19 and 52 to alter the bias thereof to permit erasure on flyback. As previously described, the cathode and grid potentials of the recording gun (cathode 27) must be shifted during the erase operation. Such shift is provided in the supplies 96 which may assumed any form necessary to perform the desired function.

Erasure of the stored transmitter signals corresponding to the received signals being erased may easily be brought about at the same time under control of the signal from amplifier 95 which by delivery to the horizontal recording sweep generator 54 can initiate a special forward traveling erase sweep. This signal can be obtained at several points in the circuit of either the vertical record and erase sweep generator 51 or the first horizontal recording sweep generator 50. To insure that the forward horizontal sweep occurs only after the vertical sweep produced by generator 51 has had sufficient time for complete flyback, a delay producing device such as a delay line is inserted in the erase sweep trigger pulse path to circuit 54 providing a purposeful delay of a few microseconds in the time of starting a forward erase horizontal sweep.

For certain applications it may be undesirable to erase received signals during the horizontal return trace as just described. Rather it may be preferred to sacrifice operating time to erase during a separate forward horizontal sweep. Such operation may be obtained by changing the apparatus to that shown in FIG. 5-A which differs only slightly from that of FIG. 5. This apparatus of FIG. 5-A has a frequency multiplier 97 which doubles the frequency of the negative polarity keying pulses to tube 82 so that the trigger circuit of tubes 82-83 operates at double the frequency of the same circuit in FIG. 5 (double the transmitter pulse recurrence frequency). Thus horizontal sweep signal generated across capacitance 85 in 5-A are at twice the frequency of those of FIG. 5 and the maximum range capabilities are halved unless the time separation between the pulses produced by timer 13 is doubled. Reset of the trigger circuit of tubes 82-83 is provided each time the voltage across capacitance 85 reaches a prearranged value, unblocking tube 98 momentarily providing negative reset keying pulse signals to bring the circuit of tubes 82-83 to the condition wherein tube 83 is conductive.

The same negative signals produced at the anode of tube 98 are applied through an isolating unilateral impedance element 98-A to the frequency dividing trigger circuit of tubes 99-A, 99-B to provide short duration positive pulses for the grid of tube 90 at the frequency of input pulses at terminal 80, however they are delayed with respect thereto. The step generator of tubes 90 and 94 thus operates as in FIG. 5.

Control voltages for the cathode and grid supplies to control the potentials thereof in the record and erase operations are obtained from the block 96 as before, as are transmitter erase signals for sweep 54 but these voltages are controlled from a connection to the trigger circiut of tubes 99-A and 99-B, typically at the grid of tube 99-A.

To summarize the operation of this circuit, a first negative pulse at terminal 80 will cause the circuit of tubes 82-83 to change from an initially assumed condition with tube 83 conductive to a condition with tube 82 conductive. Tube 84 is simultaneously cut-off producing a saw-tooth voltage across capacitance 85. As the potential across capacitance 85 rises, tube 98 eventually becomes conductive delivering a negative reset signal through impedance element 89 to the anode of tube 83 to cut off tube 82 and return tube 83 to conduction. Simultaneously a previously assumed conductive condition in the tube 99-B is altered providing a positive signal for tube 90 which conducts producing a vertical step in the sweep. At this time the horizontal sweep also experiences flyback with tube 84 being returned to conduction so that the beam is in a position to begin a forward trace for received signal erase operation when the multiplier 97 produces a second negative signal (at the doubled frequency). Erasure then takes place, the high potential at the grid of tube 99-A adjusting the storage tube potentials to the erase values. When tube 98 becomes conductive at the end of the erase sweep, tube 99-B is returned to conduction, however tube 90 is unaffected so that a third forward sweep, initiated by a second negative pulse to terminal 80 will drive the record electron beam of the storage tubes over the same area just erased to store new received signals. This time however, the grid of tube 99-A is at a low potential, which through the supplies 96 adjusts the storage tube potentials to the record values.

Returning to FIG. 1, sweep signals for playback of the stored received signals retained in storage device 19 are obtained from the horizontal playback sweep generator 100 and the vertical playback sweep generator 101.

The horizontal playback sweep generator 100 can operate independent of the record signal generators providing short duration repetitive sweeps of sufficient amplitude to cover the portion of the recorded signals employed in playback. Referring to FIG. 4-B this would correspond to the spacing between the lines 72 and 73.

For optimum operation with the horizontally recorded signals, it is desirable that the playback sweeps be truly horizontal like the record sweeps rather than somewhat sloping. Therefore the vertical playback sweep generator may well be one or more step wave generators such as the vertical record sweep generator 51 previously described as shown in FIG. 5 having the tubes 90 and 94 operative from the horizontal playback sweep generator 100. Where such is the case both sweep generators 101 and 51 will provide the same overall division ratio although their operation is not of necessity synchronized. If they are not synchronized, the horizontal playback sweep generator 100 may be similar to that of the tubes 82, 83 and 84 of FIG. 5 except that the trigger circuit portion (tubes 82, 83) rather than being a full slave, triggered into both conditions may be replaced by a one-shot multivibrator having one stable and one unstable condition and which is triggered into the unstable condition by the reset signals from the anode of the tube corresponding to tube 90.

Basic horizontal and vertical playback signals for storage device 19 thus obtained are supplemented by a "range search" signal which is substantially an additional horizontal sweep having a frequency even lower than the vertical sweep frequency. This range search signal obtained from the range search generator 102 provides the previously described operation discussed in connection with FIG. 4–B wherein the portion between the lines 72 and 73 is gradually swept across the stored received signals so that the entire stored record may be scanned.

To combine the two horizontal playback sweep signals for application to the storage device 19, the horizontal playback sweep generator 100 may include a mixing driver circuit such as shown in FIG. 6 which receives the high frequency small amplitude horizontal playback signals and the large amplitude, low frequency range search signals.

In its simplest equivalent, the circuit may be compared with the cathode coupled push-pull amplifier such as that shown in "Time Bases" by O. S. Puckle, John Wiley and Sons, Inc., December 1944, page 119. This circuit employs two tubes 105, 106 in a push-pull circuit having a single large un-bypassed cathode resistor 107. By virtue of the large size of this cathode resistor 107 each tube is capable of functioning somewhat as a cathode follower. For example when grid 108 rises 2 volts in response to an input signal, tube 105 will become more conductive producing a negative signal at anode 109, and raising the cathode potential approximately one volt. By this action conductivity in tube 106 is decreased producing a positive signal at anode 110. Corresponding action takes place responsive to variations at the grid 111.

Thus either input signal as applied to the grids 108 and 111 can appear in a push-pull manner at the anodes 109 and 110. When two signals are simultaneously applied to grids 108 and 111, the push-pull output will be a composite thereof. Typically then, grid 108 may receive the high frequency small amplitude horizontal playback signals produced within block 100 (FIG. 1) whereas grid 111 receives the range search signals from block 102 (FIG. 1).

Composite horizontal deflection signals for playback thus obtained may be applied to typical electrostatic deflection means for the playback electron gun (of cathode 37 FIG. 2) 112 of the storage device 19. Coupling means such as the capacitances 113 and 114 as well as the ganged beam centering controls 115 and 116 are incorporated therewith.

Signal integration thus far described has been considered where there is no relative motion between the radar system and an energy reflective object so that Doppler effect will not altar the frequency of return energy and thus alter the precisely adjusted pattern of playback achieved in FIG. 3. Such an idealized condition could rarely ever occur and even in case it did, the range sweep across the stored received signals would still introduce an artificial high Doppler frequency variation. To compensate for such frequency alterations as well as to derive very useful information therefrom, additional equipment, some of which has already been mentioned in passing, is employed in the overall apparatus.

As already briefly mentioned, the transmitter pulses are also stored in addition to the stored received signals. Transmitter signals are retained cycle by cycle in storage device 52 and as stored are at substantially the same frequency as the stored received signals placed in the receiver signal storage device 19 due to the action of the mixers 16 and 53 and local oscillator 17.

Transmitter pulses are stored in their entirety and may be represented by the multiple lines on FIG. 4–A. In accordance with the previously discussed storage and playback techniques, each transmitter pulse is stored as electron intensity or concentration variation along straight horizontal lines between the vertical lines 120 and 121 with the allowance of additional vacant time between lines 121 and 122 to maintain coherence in playback. As before, the spacing between lines 120 and 122 is made equal to an integral whole number multiple of the length (or duration) of the individual cycles.

Correspondence between the stored signals retained by the storage devices 19 and 52 is maintained by employing the same playback vertical step-wise sweeping signal for both. Horizontal sweeping is a different matter however, because if the storage devices 19 and 52 employ identical tubes, the linear sweep rate in device 52 will be much faster than in device 19. This is shown in FIGS. 4–A and 4–B where the actual sweep time spacings between the lines 120–122 and 72–73 are equal. With such a difference in sweep rates it generally is more practical to employ separate horizontal recording sweep generators 50 and 54 rather than just amplifying a portion of the horizontal recording sweep signal for device 19 to obtain the more rapid horizontal recording sweep signal for transmitter storage device 52. Since the second horizontal recording sweep generator 54 must produce a very short duration recording sweep, there is no difficulty in the erase operation for storage device 52 which can take place as previously mentioned during a flyback time which can be much longer than the forward or record sweep time or during a separate erase sweep.

Playback of signals retained in the storage devices 19 and 52 is undertaken simultaneously. The playback of received signals has already been discussed at considerable length. Substantially the same step-wise vertical playback signal is employed for both storage devices 19 and 50. The horizontal playback signal for transmitter signal storage device 52 on the other hand requires no range search, it being merely the horizontal playback signal for storage device 19 suitably amplified by the horizontal playback speed control 125. Each time a portion of the received record subsequent to one transmitter pulse and substantially equal in duration to the duration of the transmitter pulse is played back, the transmitter signal is also played back. Two output signals thus coincident are combined in third mixer 126 which produces beat frequency signals at the difference in frequency between the two signals, the frequency difference arising from a slight difference in playback rates between the transmitter and receiver signals. This difference is deliberately inserted by speed control 125. To provide integration of the output stored transmitter and receiver signals, the separate input signal paths to mixer 126 will normally be moderately high "Q" resonant circuits employing for example, inductance and capacitance tuned elements.

As has been pointed out, the playback signals from the storage devices 19 and 52 are at intermediate frequency and hence require tuned circuits for the handling thereof. Consequently the storage devices 19 and 52 will normally have band-pass output circuits and the mixer 126 will have band-pass input circuits. These circuits are chosen to have a bandwidth which is very narrow compared to the transmitter impulse spectrum to provide integration action for the rejection of noise.

Beat frequency output signals from mixer 126 will in general constitute the receiver output signals and are presented by the utilization device 127. Utilization device 127 may assume many and diverse forms. In its simplest it could be merely a suitable voltmeter or milliammeter, whereas some of the other forms may also give range and bearing indication. For such more complex information, connections to the range unit 13, antenna scanning mechanism for antenna 15, and elsewhere, would be required.

Discriminator 128 also receives the beat frequency signals from mixer 126. Discriminator 128 is tuned to a selected frequency which may be fixed or adjustable at will. In customary manner discriminator 128 produces D.-C. output signals dependent in polarity and amplitude on the frequency of applied signals with respect to the selected frequency and provides a portion of a ready control path to maintain the beat signals from the third mixer at a selected frequency. This control path operates to vary the relative rate of playback of one of the stored signals (received or transmitted) so that a constant playback frequency is maintained despite actual Doppler frequency shifts due to relative motion between a target and the system or artificial Doppler frequency shifts due to the sweep of the received signals in the playback thereof due to the "range search."

For such controlled frequency action, the playback rate of either the stored transmitter signals or the stored receiver signals may be varied in accordance with the discriminator output. Where variation of the transmitter signals is desired, the control signal can be applied to the horizontal playback speed control 125 to vary the rate of sweep of the stored transmitter signals as shown in FIG. 1, or they may be applied to the range search unit 102 to vary the speed of range search as shown in FIG. 1–A. In either case, attention must be paid to the polarity of the control signals because the two devices 102 and 125 require sweep rate variations of opposite sense to produce the same net frequency alteration effect.

As a conclusion regarding the last few components and their interaction it is well to note that the input signals to the third mixer 126 are generally at an intermediate frequency, however it is not beyond the realm of possibility that it might be an audio or a video frequency or frequency band. Where the input is at an intermediate frequency, the relation of the intermediate frequency to the frequency of the intermediate frequency signals applied to the storage devices 19 and 52 is a function of the relative horizontal speeds of recording and playback on each storage device. Although it is usually the case that the playback speed is less than the record speed, in some combinations it is entirely possible that the playback speed will be faster than the recording speed, in which case the inputs to the third mixer 126 would be at a higher frequency than the intermediate frequency inputs to the storage devices 19 and 52.

The frequency of the output signals from third mixer 126 will depend upon the frequency relationship between the two signals applied to mixer 126, this relationship, in turn, is a function of the relative horizontal playback speeds, the received signal playback speed being a function of the combined rates of the horizontal playback sweep (produced by generator 100) and the range search sweep produced by unit 102.

In certain situations where there are many return signals obtained from objects having the same range rate, for example "sea-return" or "clitter" which is return from waves, it may be desirable to control the playback to obtain constant playback frequency signals for this particular range rate. Thus received signals for objects with other range rates will be at once apparent. This type operation is provided by the connection of third mixer 126 to discriminator 128 as shown.

In other situations where clutter is of minor importance the circuit may be set up with slightly different timing between the various components. The timer and range gate unit 13 is set to deliver the trigger pulse to the first horizontal recording sweep generator 50 at the start of the transmitter pulse so that the range interval stored by storage device 19 includes the transmitter pulse. Thus the transmitter pulse will also be stored by the receiver signal storage device 19 because inevitably enough transmitter energy will find its way through the receiver circuit despite the operation of transmit-receive switch 14.

With transmitter signals thus placed in the receiver storage device at the beginning of the stored range interval, each time the range search unit 102 begins the range search, the mixer will receive stored transmitter signals from both storage devices. Mixer 126 output signals in this case would not go directly to discriminator 128 but indirectly through a gating circuit 103 which by virtue of a connection to the range search 102 is operative to transmit signals only when the range search is at the beginning of the stored-received signal range interval. Thus only beats between the transmitter signals will be effective to control the range search speed to maintain it substantially constant, thus removing false Doppler introduced by the range search. Any Doppler displayed by received signals would then be due to relative motion of the object and the locator system.

As still another possibility, the gate 103 can be rendered transmissive to mixer output signals only when the range search reaches a particular range selected by a control 102–A. Thus the playback speed can be controlled to the range rate of an energy reflective object at a particular range.

From the foregoing discussion it is apparent that considerable modification of the features of the present invention is possible without exceeding the scope thereof as defined in the appended claims.

What is claimed is:

1. In a pulse-echo object locating system comprising means for periodically transmitting impulses and for receiving the reflection thereof from remote objects the combination of a first signal storage device, means for controlling the storage in said first signal storage device of echo signals received over a selected range interval following each of a plurality of transmitted impulses, playback control means coupled to said first signal storage device for controlling the playback in rapid sequence of the echo signals in a portion of the range interval following each transmitted impulse, said portion corresponding substantially to the transmitted impulse duration, a second signal storage device, means for controlling the storage of a plurality of impulses producing the echo pulses, playback control means coupled to said second signal storage device for controlling the playback of each stored impulse in coincidence with the playback of stored echo signals corresponding thereto, and means for combining the playback signals from said first and said second signal storage devices.

2. A pulse-echo object locator system comprising, a pulse transmitter for producing pulses of oscillatory energy having a selected recurrence frequency, radiator means connected to the pulse transmitter for emitting the energy produced thereby and for intercepting return energy reflected from distant objects, receiver means connected to the radiator means for amplifying return signals and for delivering the same in carrier waveform to an output terminal, storage means coupled to said output terminal for retaining for a plurality of successive pulses amplified received signals obtained over a selected range interval following each emitted pulse, playback control means connected to said storage means for controlling the playback of retained signals to reproduce in succession a portion of each stored range interval equal to the duration of the emitted pulses at substantially the same range for each, and integrating means for combining the playback signals.

3. A pulse-echo object locator system comprising, a pulse transmitter for producing pulses of oscillatory energy having selected recurrence frequency, radiator means connected to the pulse transmitter for emitting the energy produced thereby and for intercepting return energy reflected from distant objects, receiver means connected to the radiator means for amplifying return signals and for delivering the same in carrier waveform to an output terminal, storage means coupled to said output terminal for retaining for a plurality of successive pulses amplified received signals obtained over a selected range interval following each emitted pulse, playback control means connected to said storage means for controlling the playback of stored signals reproducing in succession a portion of each stored range interval equal to the duration of the emitted pulses and at substantially the same range for each, playback sweep means for progressively moving the playback portion of the stored range interval across the entire stored range interval, and integrating means for combining the playback signals.

4. A pulse-echo object locator system comprising, a pulse transmitter for producing pulses of oscillatory energy having a selected recurrence frequency, radiator means connected to the pulse transmitter for emitting the energy produced thereby and for intercepting return energy reflected from distant objects, receiver means connected to the radiator means for amplifying return signals and for delivering the same in carrier waveform to an output terminal, storage means coupled to said output terminal for retaining for a plurality of successive pulses amplified received signals obtained over a selected range interval following each emitted pulse, playback control means connected to said storage means for controlling the playback of storage signals reproducing in succession a portion of each stored range interval equal to the duration of the emitted pulses and at substantially the same range for each, playback sweep means for progressively moving the playback portion of the stored range intervals across the entire stored range interval, erase control means for controlling the individual removal of the stored return energy for each emitted pulse after it has been retained for a selected period of time to allow storage of new information as it is received and integrating means for combining the playback signals.

5. A pulse-echo object locator system comprising, a pulse transmitter for providing pulses of oscillatory energy having a selected recurrence frequency, radiator means connected to the pulse transmitter for emitting the energy provided thereby and for intercepting return energy reflected from distant objects, receiver means connected to the radiator means for amplifying return signals and for delivering the same in carrier waveform to an output terminal, an electron beam signal storage device having an electron storage medium and first and second electron beam producing devices therein arranged to direct their electron beams on said storage medium, means coupling the first electron beam device of the storage device to the output terminal of the receiver so as to control the intensity of the electron beam produced thereby to store as electron concentration variations on said storage medium echo signals received over a selected range interval followed each of a plurality of pulses, means scanning the electron beam produced by the first electron beam producing device over a selected area of the storage medium so as to distribute the signals stored thereon, playback control means connected to the second electron beam device of the storage device operative to scan the electron beam produced by the second electron beam producing device over the storage area to reproduce in rapid sequence a selected portion of the range interval for each pulse, said portion being substantially equal to the pulse duration, and integrating means for combining reproduced signals.

6. A pulse-echo object locator system comprising, a pulse transmitter for providing pulses of oscillatory energy having a selected recurrence frequency, radiator means connected to the pulse transmitter for emitting the energy provided thereby and intercepting return energy reflected from distant objects, receiver means connected to the radiator means for amplifying return signals, a first electron beam signal storage device having an electron storage medium and first and second electron beam producing devices therein cooperative with electron concentrations on said storage medium, first storage control means cooperative with the first electron beam device of the first storage device and the receiver responsive to control the intensity and direction of travel of the electron beam produced thereby to store as electron concentration variations echo signals received over a selected range interval following each of a plurality of pulses, first playback control means cooperative with the second electron beam device of the first storage device operative to control the reproduction in rapid sequence of a selected portion of the range interval for each pulse, said portion being substantially equal to the pulse duration, a second electron beam signal storage device having an electron storage medium and first and second electron beam producing devices therein cooperative with electron concentrations on said storage medium, second storage control means cooperative with the first electron beam device of the second storage device and with the transmitter responsive to control the intensity and direction of travel of the electron beam produced thereby to store as electron concentration variations the pulse signals producing the aforementioned echo signals, second playback control means cooperative with the second electron beam device of the second storage device to reproduce in rapid sequence the stored pulse signals in time coincidence with the playback of a portion of a range interval of received echo signals corresponding thereto, and narrow bandwidth integrating means for combining reproduced signals.

7. A pulse-echo object locator system comprising, a pulse transmitter operative to provide pulses of oscillatory energy having a selected recurrence frequency, radiator means connected to the pulse transmitter for emitting the energy provided thereby and for intercepting return energy reflected from distant objects, receiver means connected to the radiator means for amplifying return signals, an electron beam signal storage device having an electron storage medium and first and second electron beam producing devices therein cooperative with electron concentrations on said electron storage medium, means cooperative with the first electron beam device of the storage device and the receiver responsive to control the intensity and direction of travel of the electron beam produced thereby to store as electron concentration variations echo signals received over a selected range interval following each of a plurality of pulses, first playback control means cooperative with the second electron beam device of the storage device to reproduce in rapid sequence a selected portion of the range interval for each pulse, said portion being substantially equal to the pulse duration, second playback control means cooperative with the first playback control means to progressively vary the selected portion of the range interval to cover the entire range interval in a stepwise manner, and a utilization system for receiving reproduced signals.

8. A pulse-echo object locator system comprising, a pulse transmitter operative to provide pulses of oscillatory energy having a selected recurrence frequency, radiator means connected to the pulse transmitter for emitting the energy provided thereby and for intercepting return energy reflected from distant objects, receiver means connected to the radiator means for amplifying return signals, a first electron beam signal storage device having an electron storage medium and first and second electron beam producing devices cooperative with electron concentrations on said storage medium, first storage control means cooperative with the first electron beam device of the first storage device and the receiver responsive to control the intensity and direction of travel of the electron beam produced thereby to store as electron concentration variations echo signals received over a selected range interval following each of a plurality of pulses, first playback control means connected to the second electron beam device of the first storage device operative to reproduce in rapid sequence a selected portion of the range interval for each pulse, said portion being substantially equal to the pulse duration, second playback control means cooperative with the first playback control means operative to progressively vary the selected portion of the range interval in a stepwise manner, a second electron beam signal storage device having an electron storage medium and first and second electron beam producing devices cooperative with electron concentrations on said storage medium, second storage control means cooperative with the first storage control means cooperative with the first electron beam device of the second storage device and the transmitter responsive to control the intensity and direction of travel of the electron beam produced thereby to store as electron concentration variations the transmitter pulse signals, second playback control means cooperative with the first playback control means to reproduce each transmitter pulse in coincidence with each playback of a portion of an echo range interval corresponding thereto, a mixer for combining playback echo signals and playback pulse signals to derive difference frequency signals, and means for utilizing the difference frequency signals to indicate presence of energy return objects.

9. In a pulse echo object locator system, the combination of, means for periodically transmitting carrier wave energy pulses, receiving means for receiving echoes of said pulses after reflection from remote objects and for delivering said echoes to an output terminal in carrier waveform, a storage device coupled to the output terminal of said receiving means, signal storage control means coupled to said storage device and operative to render said storage device effective to store output echo signals delivered by said receiver over a selected range interval following each transmitted pulse, the storage operation being such that the echo signals received over said selected range intervals following each of a plurality of transmitter pulses being coexistent in the storage device, and playback control means coupled to said storage device operative to play back in rapid sequence the echo signals received during a corresponding selected portion of each of the stored range intervals, said portion corresponding to the transmitted pulse duration.

10. In a pulse echo object locator system, the combination of, means for periodically transmitting carrier wave energy pulses, receiving means for receiving echoes of said pulses after reflection from remote objects and for delivering said echoes to an output terminal in carrier waveform, a storage device coupled to the output terminal of said receiving means, signal storage control means coupled to said storage device and operative to render said storage device effective to store output echo signals delievered by said receiver over a selected range interval following each transmitted pulse, the storage operation being such that the echo signals received over said selected range intervals following each of a plurality of transmitter pulses being coexistent in the storage device, playback control means coupled to said storage device operative to play back in rapid sequence the echo signals received during a corresponding selected portion of each of the stored range intervals, said portion corresponding substantially to the transmitted pulse duration, and utilization means coupled to said storage device to receive the signals resulting from said playback.

11. In a pulse echo object locator system, the combination of, means for periodically transmitting carrier wave energy pulses, receiving means for receiving echoes of said pulses after reflection from remote objects and for delivering said echoes to an output terminal in carrier waveform, a cathode ray tube storage device having electron beam producing means and a storage medium associated therewith, means coupling the output terminal of said receiving means to said storage device, signal storage control means including electron beam scanning means coupled to said storage device and operative to render said storage device effective to store the train of output echo signals delivered from said receiver over a selected range interval following each transmitted pulse as a separate signal track, and playback control means including a second beam deflection circuit coupled to said storage device operative to scan said storage medium so as to reproduce in rapid sequence the echo signals received during a corresponding selected portion of each of the stored range intervals, said portion corresponding substantially to the transmitted pulse duration.

References Cited by the Examiner

UNITED STATES PATENTS

| | | | |
|---|---|---|---|
| 2,410,233 | 10/1946 | Percival | 343—11 X |
| 2,422,295 | 6/1947 | Eaton | 343—11 |
| 2,430,038 | 11/1947 | Wertz. | |
| 2,430,307 | 11/1947 | Smith | 343—11 |
| 2,451,484 | 10/1948 | Gould et al. | 343—5 X |

CHESTER L. JUSTUS, *Primary Examiner.*

SAMUEL YAFFEE, NORMAN H. EVANS, FREDRERICK M. STRADER, *Examiners.*

A. K. GEER, G. J. MOSSINGHOFF, P. M. HINDERSTEIN, *Assistant Examiners.*